(12) United States Patent
Schnaars, Sr. et al.

(10) Patent No.: US 9,879,393 B2
(45) Date of Patent: *Jan. 30, 2018

(54) FLOOD WALL PROTECTION SYSTEM

(71) Applicants: AMERIGLOBE, LLC, Lafayette, LA (US); Everett Leslie Waid, Jr., Fort Myers, FL (US)

(72) Inventors: Daniel R. Schnaars, Sr., Lafayette, LA (US); Everett Leslie Waid, Jr., Fort Myers, FL (US)

(73) Assignee: Ameriglobe, LLC, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,733

(22) Filed: Nov. 3, 2015

(65) Prior Publication Data
US 2016/0251814 A1   Sep. 1, 2016

Related U.S. Application Data

(63) Continuation of application No. 13/492,492, filed on Jun. 8, 2012, now Pat. No. 9,175,451, which is a
(Continued)

(51) Int. Cl.
*E02B 3/10* (2006.01)
*B65B 43/54* (2006.01)
*E02B 7/00* (2006.01)

(52) U.S. Cl.
CPC .............. *E02B 3/108* (2013.01); *B65B 43/54* (2013.01); *E02B 7/005* (2013.01)

(58) Field of Classification Search
CPC ................................ E02B 3/108; B65B 43/54
(Continued)

(56) References Cited

U.S. PATENT DOCUMENTS 3,213,628 A * 10/1965 Serota ..................... E02B 3/108
220/62.21
4,594,206 A * 6/1986 Grafton ..................... E02B 3/06
264/257
(Continued)

FOREIGN PATENT DOCUMENTS

AT          411913         7/2004
DE    102006035966 A1     2/2008
(Continued)

*Primary Examiner* — Frederick L Lagman
(74) *Attorney, Agent, or Firm* — Garvey, Smith & Nehrbass, Patent Attorneys, L.L.C.; Julia M. FitzPatrick; Gregory C. Smith

(57) ABSTRACT

A system and method for constructing any desired length of height linear cellular chain for use as a protective wall system, including a chain of fabric bulk bags, each having an open upper end, and interconnected along their sidewalls to define the cellular chain; and a fabric channel formed on the upper ends of each of the adjoining bags sidewalls for engaging a bag support and filling system, which includes a first metal frame member having a pair of arm members for threading through two adjacent fabric channels; the frame supported by a base member resting on the ground; a second metal frame member for receiving the distal ends of each of the arm members of the first metal frame member, at a level so that the bulk bag is supported by the arm members; bulk material to be poured into the supported bulk bag, to a level that the bag is substantially filled and no longer requires the support of the frame, so that the frame can be removed and positioned onto the next pair of fabric channels to fill the next empty bag.

12 Claims, 17 Drawing Sheets

Related U.S. Application Data continuation-in-part of application No. 13/422,593, filed on Mar. 16, 2012, now Pat. No. 9,085,866, which is a continuation-in-part of application No. 13/364,114, filed on Feb. 1, 2012, now Pat. No. 8,672,585.

(60) Provisional application No. 61/453,402, filed on Mar. 16, 2011, provisional application No. 61/438,313, filed on Feb. 1, 2011, provisional application No. 61/504,595, filed on Jul. 5, 2011.

(58) Field of Classification Search
USPC ....... 405/15, 16, 17, 18, 107, 111, 114, 115, 405/116, 284; 141/10
See application file for complete search history.

(56) References Cited

U.S. PATENT DOCUMENTS

| | | | |
|---|---|---|---|
| 4,692,060 A | | 9/1987 | Jackson, III |
| 4,807,299 A | * | 2/1989 | Nattrass ............. B65D 88/1681 383/109 |
| 5,040,919 A | * | 8/1991 | Hendrix ................. E02B 3/108 405/115 |
| 5,236,281 A | | 8/1993 | Middleton |
| 5,340,218 A | * | 8/1994 | Cuthbertson ...... B65D 88/1681 206/600 |
| 5,584,599 A | | 12/1996 | Knittel |
| 5,632,573 A | | 5/1997 | Baker |
| 5,771,665 A | * | 6/1998 | Nelson .................... B65B 43/56 141/10 |
| 6,164,870 A | | 12/2000 | Baruh |
| 6,390,154 B1 | * | 5/2002 | Hall ....................... E02B 3/108 141/314 |
| 6,551,025 B2 | | 4/2003 | Dery |
| 6,619,884 B2 | | 9/2003 | Davis et al. |
| 6,637,474 B2 | * | 10/2003 | Hall ........................ B65B 1/06 141/231 |
| 7,431,534 B2 | | 10/2008 | Harbeck |
| 7,445,403 B2 | | 11/2008 | Williams et al. |
| 7,449,105 B2 | | 11/2008 | Hastings |
| 7,491,016 B2 | | 2/2009 | Baruh |
| 7,591,611 B2 | | 9/2009 | Arellanes et al. |
| 7,651,298 B2 | | 1/2010 | Boudreaux, Jr. |
| 8,235,631 B2 | | 8/2012 | Adams et al. |
| 8,672,585 B2 | | 3/2014 | Schnaars, Sr. et al. |
| 9,085,866 B2 | | 7/2015 | Schnaars, Sr. et al. |
| 9,175,451 B2 | * | 11/2015 | Schnaars, Sr. .......... E02B 3/108 |
| 2006/0275084 A1 | * | 12/2006 | Harbeck ................. E02B 3/108 405/116 |
| 2007/0140598 A1 | * | 6/2007 | McGillick, Sr. ... B65D 88/1612 383/22 |
| 2007/0154264 A1 | | 7/2007 | Baruh |
| 2007/0243021 A1 | * | 10/2007 | Tyler ...................... E02B 3/108 405/114 |
| 2009/0103981 A1 | | 4/2009 | Tagini |
| 2009/0274519 A1 | | 11/2009 | Shaw |
| 2010/0047019 A1 | | 2/2010 | Hvezda et al. |
| 2011/0103900 A1 | * | 5/2011 | Adams .................. E02D 29/025 405/284 |
| 2012/0195687 A1 | | 8/2012 | Beard et al. |
| 2012/0207406 A1 | * | 8/2012 | Cavenagh ............... E02B 3/108 383/38 |
| 2012/0230766 A1 | | 9/2012 | Schnaars, Sr. et al. |
| 2013/0094905 A1 | | 4/2013 | Schnaars, Sr. et al. |
| 2014/0226918 A1 | * | 8/2014 | Adams .................... E02B 3/108 383/1 |
| 2015/0151863 A1 | * | 6/2015 | Borden .................... B60P 3/14 53/493 |

FOREIGN PATENT DOCUMENTS

| | | |
|---|---|---|
| EP | 1418276 A2 | 5/2004 |
| JP | 2005-240348 A | 9/2005 |
| KR | 20-0268953 | 3/2002 |
| RU | 2131493 C1 | 6/1999 |
| WO | WO1999/011868 A1 | 3/1999 |

* cited by examiner

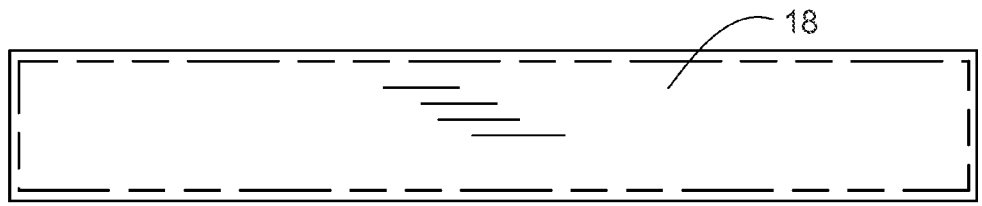
FIG. 4
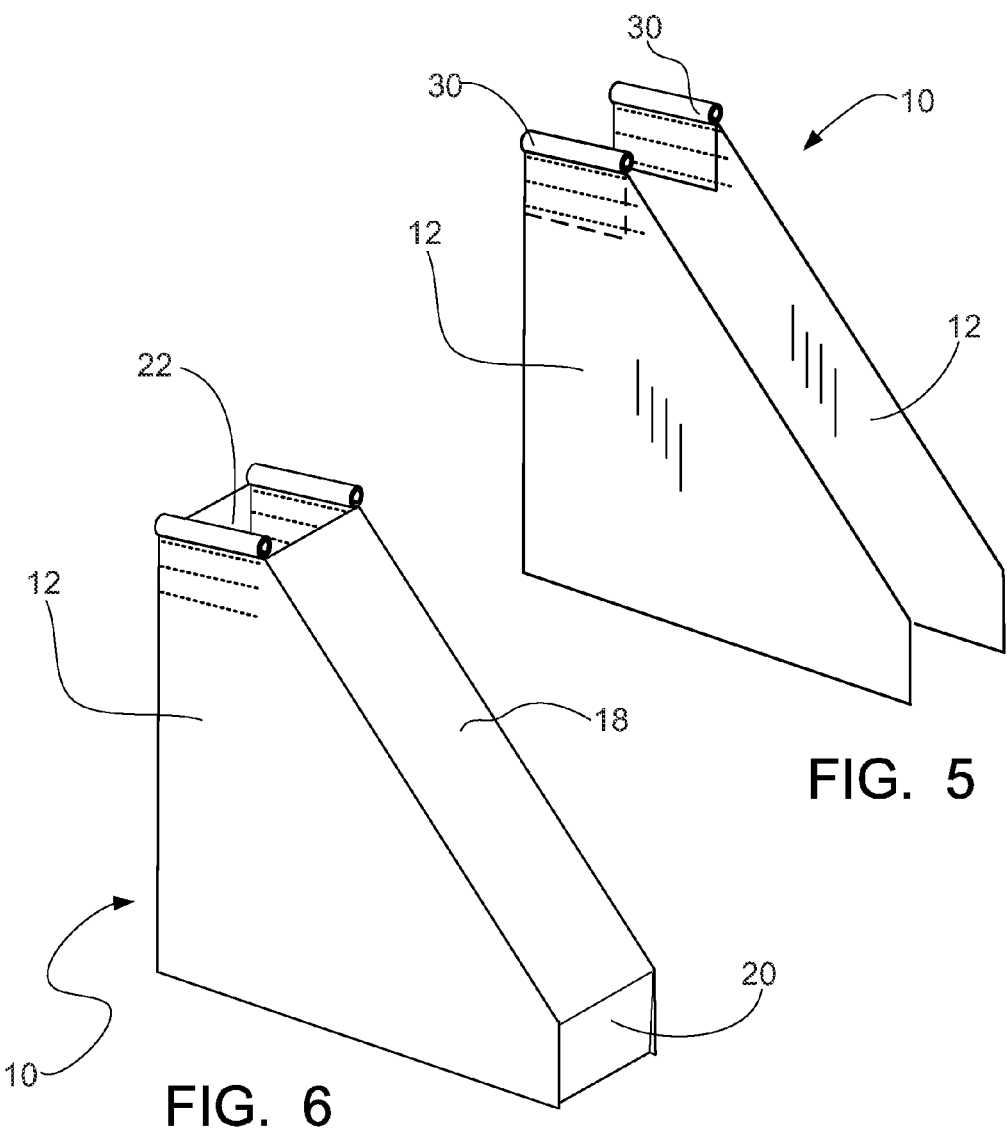
FIG. 5
FIG. 6

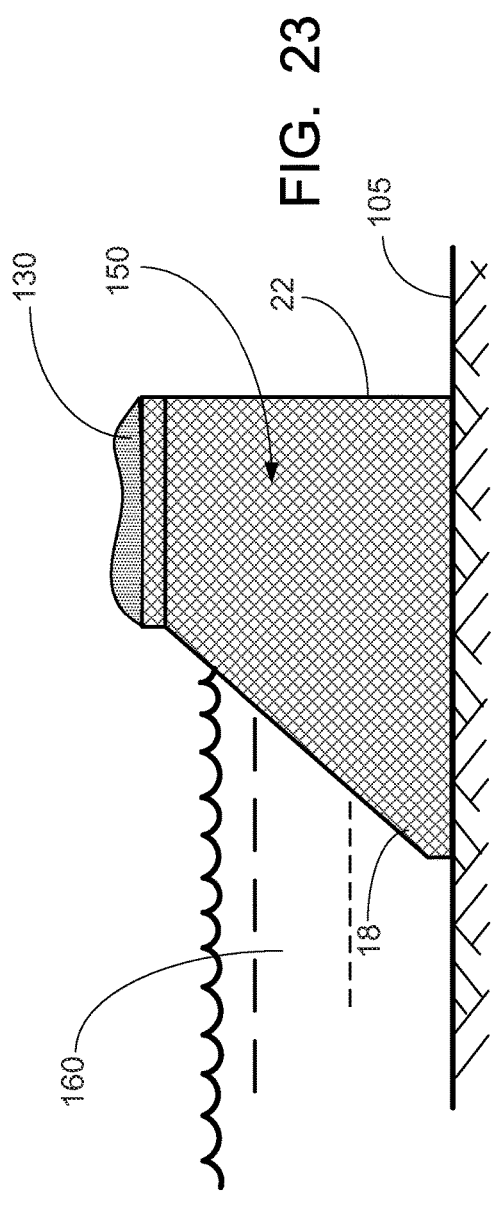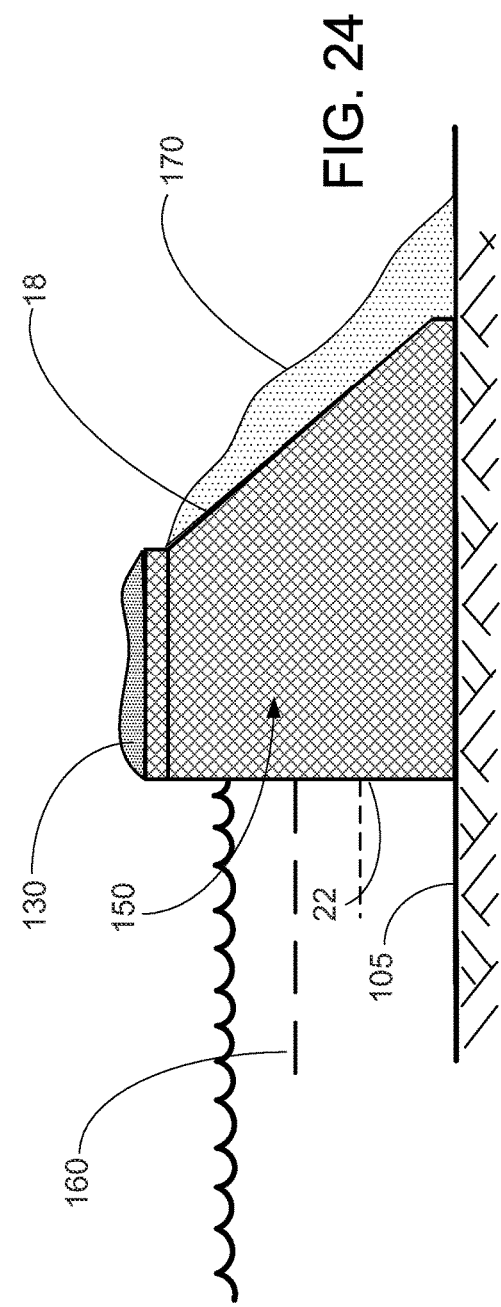

FLOOD WALL PROTECTION SYSTEM

CROSS-REFERENCE TO RELATED APPLICATIONS

This is a continuation of U.S. patent application Ser. No. 13/492,492, filed on 8 Jun. 2012 (issued as U.S. Pat. No. 9,175,451 on 3 Nov. 2015), which is a nonprovisional patent application of and claims the benefit of U.S. Provisional Patent Application Ser. No. 61/504,595, filed 5 Jul. 2011, by the same inventors, which is hereby incorporated herein by reference.

U.S. patent application Ser. No. 13/492,492, filed on 8 Jun. 2012 (issued as U.S. Pat. No. 9,175,451 on 3 Nov. 2015), is a continuation-in-part of U.S. patent application Ser. No. 13/422,593, filed 16 Mar. 2012 (issued as U.S. Pat. No. 9,085,866 on 21 Jul. 2015), entitled "FLOOD WALL PROTECTION SYSTEM", by the same inventors; which is a continuation in part of U.S. patent application Ser. No. 13/364,114, filed 1 Feb. 2012 (issued as U.S. Pat. No. 8,672,585 on 18 Mar. 2014), entitled "FLOOD WALL PROTECTION SYSTEM", by the same inventors, both of which are hereby incorporated herein by reference.

Priority of U.S. patent application Ser. No. 13/492,492, filed on 8 Jun. 2012; U.S. patent application Ser. No. 13/422,593, filed 16 Mar. 2012; U.S. patent application Ser. No. 13/364,114, filed 1 Feb. 2012; U.S. Provisional Patent Application Ser. No. 61/504,595, filed 5 Jul. 2011; U.S. Provisional Patent Application Ser. No. 61/453,402, filed 16 Mar. 2011 (hereby incorporated herein by reference); and U.S. Provisional Patent Application Ser. No. 61/438,313, filed 1 Feb. 2011 (hereby incorporated herein by reference), all of which are incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to temporary flood walls. More particularly, the present invention relates to a system and method which utilizes a continuous line of interconnected bulk bags, each bag having sleeves that are fitted into each connecting bag wall. This sleeve allows a support frame to engage and support the bulk bags that are being filled, and after filling, the frame is disengaged and "leap frogs" along the entire length or chain of bags until all of the bulk bags in the chain are filled to define the continuous flood barrier wall.

2. General Background of the Invention

The art of building temporary flood walls is well known. The most commonly known method is to fill small bags full of sand and stack them up in a pyramid fashion to hold back flood waters. These small bags weighed between 50 and 100 pounds (between 22.68 and 45.36 kilograms). Building flood walls with this method involves a lot of labor and time.

It is also well known in the art that once flexible fabrics are formed into continuous cellular walls, and filled with sand and dirt, it forms a solid barrier against water. However, filling these flexible containers on banks along rivers and shore lines is not an easy task. The flexible walls must be properly supported until the containers are filled. One such method accomplishes this by using a large metal sled that supports each portion of the cellular wall as it is filled. The sled is then pulled along a horizontal line until it clears the filled cell and new unfilled cells are opened and supported under the sled waiting to be filled.

Existing methods support each cell's corner with a special plastic hangar that is not readily available and is therefore expensive. These plastic hangars can only be used a single time. As two hangars are used every two feet (0.61 meters) of the wall, the costs of these special parts add up over the course of each mile of wall that is placed. Further, with only the corners supported, there is noticeable sagging of the cellular walls as each cell is filled. This sagging creates uneven tensions on the four holders. The uneven tension can often overload individual hangars and cause them to fail during the movement of the sled.

The individual cells of the wall can be filled with up to 7,000 pounds (3,175 kilograms) of sand or dirt. After filling, the sled moves horizontally. The hangars must slide along metal rails until they clear the sled. Under this tremendous weight, these hangars can fail and cause the cells to drop from the sled prematurely.

Other methods involve simply piling truckloads of sand and dirt on top of levees. But while this method is fast, it is prone to washouts as the sand and dirt is uncontained against the flow of water.

Still another method uses open top bulk bags with wooden frames inside them which are bolted together in a cellular fashion to create vertical long walls that are then filled with sand and dirt. It is a fairly fast method for constructing walls but has the expense of the wood and is limited to vertical walls that can be pushed over by fast moving flood waters or collapsed from beneath as the flood waters hollow out the ground beneath them.

Still another method uses specially shaped bags that have triangular shaped sides. These bags are delivered using a large sled device that makes filling easier and faster than the methods listed above. However, this sled device relies on a bag support method that requires special parts to support each bag by its four corners that can be expensive and unreliable. Further the triangular shaped front of the containers are often unfilled due to its pointed toe. Due to the wave action of the flood waters, the sand and dirt can move after placement and cause some loss of control over its shape. And, just as the square bags can be hollowed out from below, so can this triangular faced design.

In short, each of the existing methods of flood control that utilize flexible materials still have shortcomings that need to be addressed.

SUMMARY OF THE PRESENT INVENTION

It is the purpose of this invention to address all of these various shortcomings in a unique and straightforward manner. A system and method for constructing any desired length or height linear cellular chain for use as a protective wall system, including a chain of fabric bulk bags, each having an open upper end, and interconnected along their sidewalls to define the cellular chain; and a fabric channel formed on the upper ends of each of the adjoining bags sidewalls for engaging a bag support and filling system, which includes a first metal L shaped frame member having a pair of arm members for threading through two adjacent fabric channels; the frame supported by a base member resting on the ground; a second metal H frame member for receiving the distal ends of each of the arm members of the first metal L frame member, at a level so that the bulk bag is supported by the arm members; bulk material to be poured into the supported bulk bag, to a level that the bag is substantially filled and no longer requires the support of the frame, so that the frame can be removed and positioned onto the next pair of fabric channels to fill the next empty bag.

It is therefore a principal object of the present invention to provide a system and method of constructing any desired length or height linear cellular chain for use as a protective wall system, made of flexible materials.

It is a further object of the invention that upon providing the desired length of bags, which is preferred at 100 feet (30.48 meters) in length, there is provided a collapsible frame, which includes an L portion which has a pair of arms which thread through the sleeves of a first bag and are supported on their distal end by an H portion so that an open bag is supported thereupon, so that additional frames are erected to support additional bags in the chain, so that as each bag is filled with material, and is able to be self supporting, the frame is collapsed, and moved forward to support another bag in the chain. This "leap frog" erection of frames is done until the entire length of bags are filled, and if desired, can be connected to the next 100 foot (30.48 meter) length of bags, which are then filled in a similar fashion, until the desired length of continuous flood barrier system is erected.

In meeting these objects, this invention utilizes flexible fabric to create a continuous cellular wall in the method described above. However, it requires no wood nor any special and unreliable parts to hold it up during the filling process. It has no pointed toes that are difficult to fill. But most importantly, it resolves the problem caused by the flood hollowing out the ground beneath the barrier. By eliminating this particular problem, this invention provides far more security to any property being protected by this barrier wall than any previous method involving flexible fabrics.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 illustrates the main panel construction in the system of the present invention;

FIG. 5 illustrates the addition of sleeves to the side panels in the system of the present invention;

FIG. 6 illustrates the sewing of one main panel to two side panels;

FIGS. 23 and 24 illustrate views of a typical chain of bags where the flood waters are rising on either the front slanted face of the chain or the vertical rear wall of the chain.

DETAILED DESCRIPTION OF THE INVENTION

Figure 1:
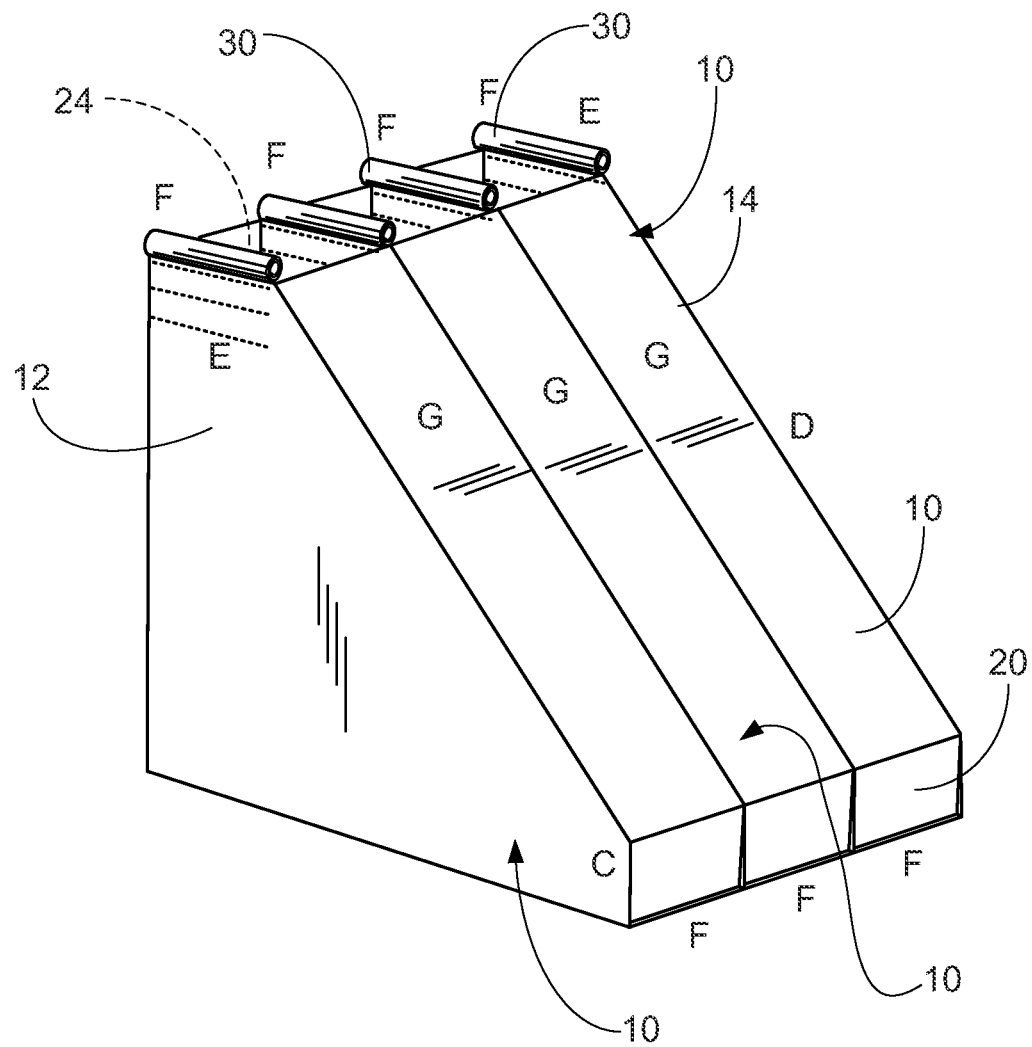
FIG. 1 illustrates an overall view of a preferred embodiment in the bags or chambers used in the system of the present invention.

FIGS. 1 through 24 illustrate the TrapBag® system and method of the present invention of filling a continuing series of bags or chambers to ultimately define a barrier wall.

Prior to a discussion of the drawing figures, it should be understood that this invention replaces the method of support as seen in the prior art with a unique sleeve support system. Instead of four individual plastic hangars that can break and allow connecting walls to sag and misshape, this invention uses a continuous sleeve that is fitted into each connecting wall. This sleeve provides a stiff and straight support for the entire length of the connecting walls by use of a metal rod which is threaded through the sleeve and supported by a frame, as will be discussed further. This complete support of the connecting wall completely eliminates the sagging during the filling process. It also spreads out the weight of the sand and dirt.

A second feature of this invention is the elimination of the pointed toe that often cannot be filled. As traditional slant sided containers are filled, the angle of repose and the coefficient of friction of the various materials used to fill them, can often prevent the fill materials from reaching the end of the toe. This invention simply eliminates this problem by designing a blunted end of the container and keeping the non-vertical side wall at or near a 45 degree angle.

A third feature of this invention is the use of the 45 degree slanted wall on one side of the flood wall. By sloping the wall facing away from the rising water, the sloped wall adds triangular force to prevent wall collapse. Bags with simple vertical walls are prone to tipping over from the force of the water.

By adding the slope opposite the force of the water, the wall has greater resistance to tipping over than even a similarly based container with vertical walls. As a vertical wall begins to tip, the weight of wall that immediately crosses the vertical position becomes encouragement for the wall to tip over. With a sloped side, there will be no weight crossing the vertical line and encouraging the container to tip over. Further, the center of gravity for the entire container is moved toward the force of the water creating even further resistance to tipping over.

However, the slope of the container can also be placed facing the water. Due to the shape of the container, there is a greater percentage of weight in the bottom half of the container. Further, when the sloped side is facing the water, it provides a few different advantages.

As the water rises on the sloped side, the weight of the water that is above the toe is added to the weight of the fill material giving this system additional holding strength.

Also, when operational space is important on the non-water side, having the vertical side away from the water provides a more visible barrier to traffic and equipment. This visibility reduces accidental damage to the barrier walls.

Further, the sloped side deflects any wave action upward in a harmless direction. When wave action hits the vertical side, some of the wave action is directed downward where it can be involved in hollowing out the base under the container.

A fourth feature is an optional wave protector. We can add a piece of fabric all along the bottom edge of the side of the bag that is facing the water. This fabric can be partially buried into the ground in front of the cells. Moving water cannot drive through this barrier and undercut the support of the ground from under the bags.

This was an important failure of the Hesco Barriers during the BP oil spill. Rolling waves will be stopped by the fabric barrier and safely run off away from the bag.

If the required barrier wall 200 is longer than the 100 foot (30.48 meter) chain of cells, new chains must be added to the back of each accordion chain before the final cell is filled. This is done by enveloping the final cell with the open walls of the next chain and tying them together. The tying together can be done in numerous ways such as using simple nylon zip ties that are threaded through holes in the materials along the joints or by utilizing ties that can be attached during the manufacturing process. The main importance is that the end wall of the earlier chain is securely fastened to the first end wall of the new chain. This eliminates any difference in the amount of filler weight per foot/meter at this point. The amount of protection remains constant even at the critical joint of each chain.

In summary, the system, which is referred to at times as The TrapBag®, comprises a series of identical chambers that are sewn together to make a continuous cellular wall. The system is constructed by building every other chamber completely, then connecting the completed chambers with a single main panel. A completed set of 34 chambers will be made up of 34 complete chambers and one (1) extra main panel. The number of cells in each chain is not critical to the invention. It is simply an amount chosen by the inventors for ease of handling and easy calculations.

The system is constructed in a series of steps that are all very similar to bulk bag production except the final stage of putting together the chain of bags. Each chamber will have two sleeves of fabric at the top opening of each chamber. These sleeves will be the total support of the chambers during the filling process. These sleeves will be added to each side panel prior to the production of the actual chamber. Dimensionally, a preferred horizontal length B will 2 feet (0.61 meters) longer than the vertical height A. The Front Toe will preferably be 1 foot (0.30 meters) tall. On each end of a completed chain will preferably be either a set of loops or an extra main panel with ties. This construction will allow chains to be tied together in the field to form a continuous barrier of any length. Should the length of barrier be less than an even number of completed chains, it is a simple effort to cut the remaining chain away while leaving the final chamber completely intact.

One of the keys to this success is the idea that these cells are all connected. The water cannot move a single cell without moving the entire line which then weighs many thousands of pounds or kilograms. The sand bags currently being used weigh 50 pounds (22.68 kilograms) or less and are not connected. If the flood can move a single bag, the water starts to flow and the hole in the protection automatically grows and grows pretty vigorously.

Several components of bags have been linked together which then define a continuous barrier wall as seen in the various views in those figures. It is this barrier wall formed by the fill bags, wherein they would support and defend against rising water as would a man-made levee. However, these would not be placed in a permanent position but may be removed after the flooding has subsided.

Turning now to the drawing Figures, FIGS. 1-11 illustrate views of the construction of the bulk bags used in the system of the present invention, while FIGS. 12 through 24 illustrate views of the system for supporting the chain of bulk bags in order to fill the bags of the chain on a continuous basis so that the bags are filled quickly, efficiently and with a minimum of labor required. Although there will be a discussion of the overall invention, referred to as the Trap-Bag®, the first discussion will relate to the construction of the individual bulk bags used as part of the present invention, as illustrated in the drawing FIGS. 1-11.

FIG. 1 illustrates a plurality of the chambers 10 engaged to one another with the dimensions of each chamber 10 set forth in the preferred embodiment. For purposes of discussion chambers 10 may also be referred to as "bags" or "cells" herein. As illustrated the chambers 10 include a pair of sidewalls 12, 14, which are basically triangular in shape, having a floor portion 16, a slanted forward face 18, terminating in a vertical toe portion 20, and a rear wall 22, all of which are secured together via stitching or the like to define a container space 24, therewithin for receiving material, such as dirt, sand, or other material. As seen further, the upper end 26 of the chamber 10 has an open end 28, into which the materials are inserted into the space 24. There is further provided a pair of fabric channels 30 for receiving rods during filling, as will be discussed in further Figures. In FIG. 1, a series of three bags 10 are placed together into a single, continuous unit in a manner to be discussed further. There is further included the preferred dimensions of the bags used in the present invention.

Figure 2:
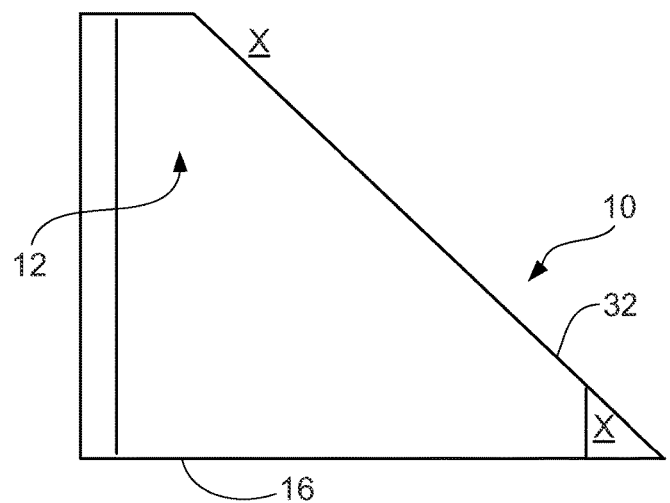
FIG. 2 illustrates the construction of the side panels in the system of the present invention.

FIG. 2 illustrates the construction of the side panels 12 by configuring two sides 12 from a single length of fabric cut along the diagonal line 32 as illustrated. The various preferred dimensions of the side panels 12 are shown in the FIG. 2.

Figure 3:
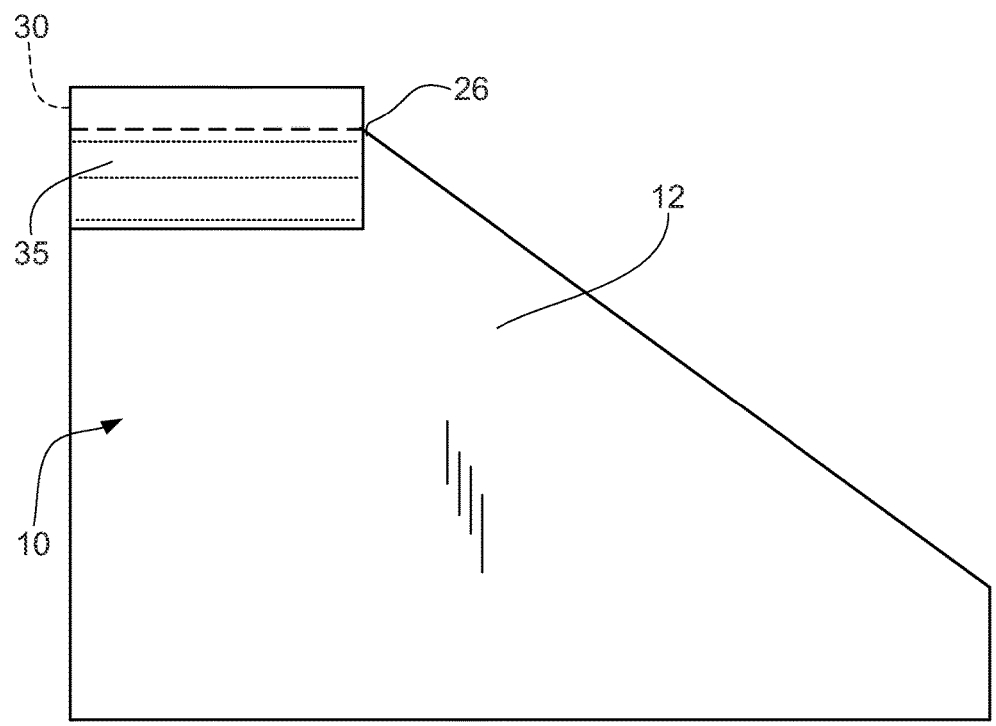
FIG. 3 illustrates the sleeve construction and attachment in the system of the present invention.

FIG. 3 illustrates the sleeve construction and the manner of attachment as described in the drawing Figure. As illustrated, each of the side panels 12 include a section of fabric 35 stitched or sewn to the upper end 26 of each of the panels 12, in an overlapping fashion, to define the upper channel 30, as was discussed in regard to FIG. 1. Again the function of these channels 30 will be discussed further.

FIG. 4 illustrates the construction of each of the front panels 18 that will be part of each of the chamber 10, in the proper length and width as described.

As seen in FIG. 5, each of the side walls 12 are fitted with the section of fabric 35 to define the upper channels 30 before the side walls 12 are engaged together to define the chamber 10. FIG. 5 illustrates the procedure or method for adding the sleeves to the side panels in the construction.

FIG. 6 illustrates the sewing of the front panel 18 and the rear panel 22 to the two side panels 12, to define the completed chamber 10.

Figure 7:
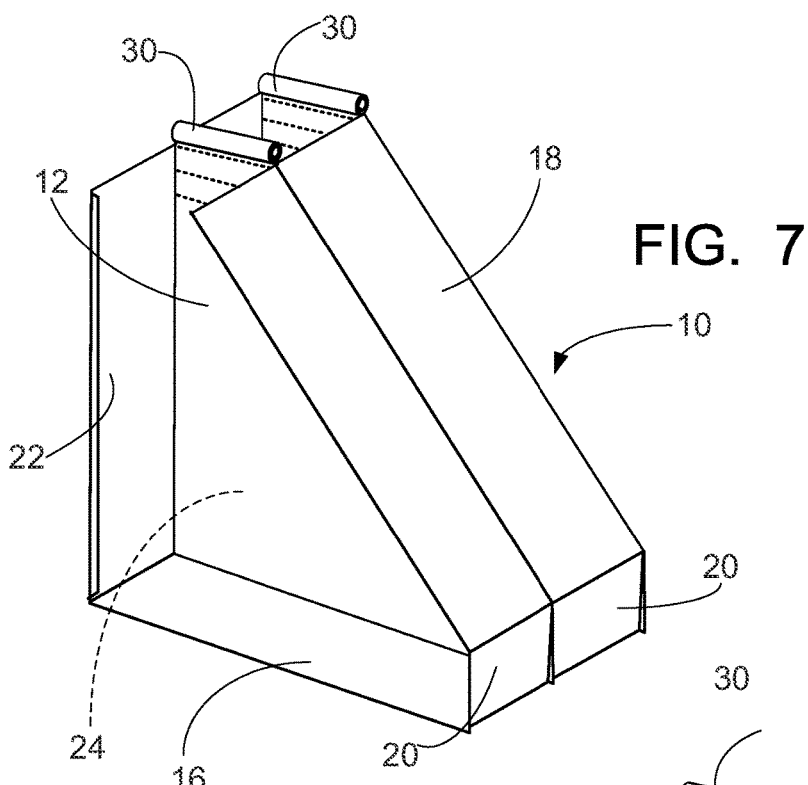
FIG. 7 illustrates adding one main panel to one completed chamber.

FIG. 7 illustrates a first completed chamber 10 being secured to a second chamber 10 and the procedure in adding one front panel 18 to one completed chamber 10 as illustrated. As seen in the FIG. 7, the second side 12 of second chamber 18 has not yet been set in place.

Figure 8:
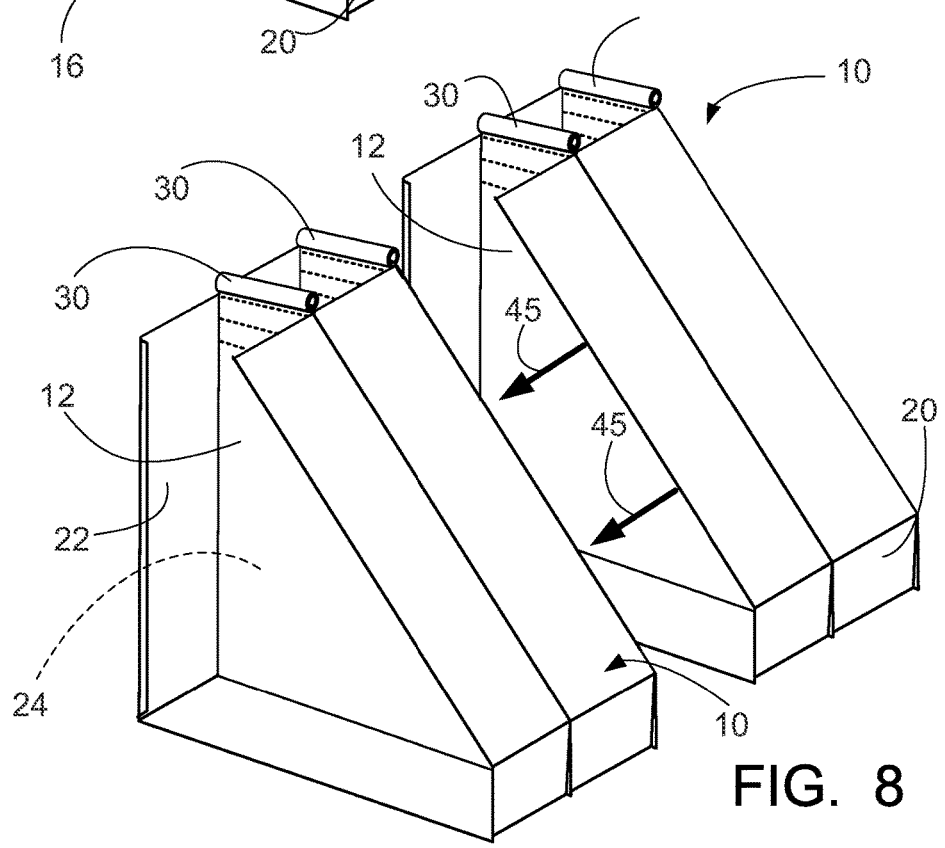
FIG. 8 illustrates linking of 20 sets together by sewing to form a 100 foot (30.48 meter) chain in the system of the present invention.

FIG. 8 illustrates the manner in which the plurality of chambers 10 are linked to one another, as seen by Arrows 45. Because each chamber 10 is secured to an adjacent chamber 10, along their side walls 12, it is seen that only one of the chambers 10 needs to have a completed side wall 12, so that when the first chamber 10, having both side walls 12 is secured to the adjacent chamber 10, one of the side walls 12 of the first chamber 10 can be shared with the adjacent chamber 10, thereby saving on fabric when construction the plurality of chambers into a continuous barrier wall 150. It is foreseen, for example, that because of the width of each completed chamber 10, twenty sets of chambers 10 sewn side by side would form a 100 foot (30.48 meter) continuous, uninterrupted chain 50 of chambers 10 to define the barrier wall 150. FIG. 8 further illustrates the linking together of numerous sets by sewing them together to form any length of chain 50 desired. It is acknowledged that the sewing patterns may be changed to accomplish the same end result. One such way would be to add each piece to a growing line rather than to make up individual groups and then sew them together.

Figure 9:
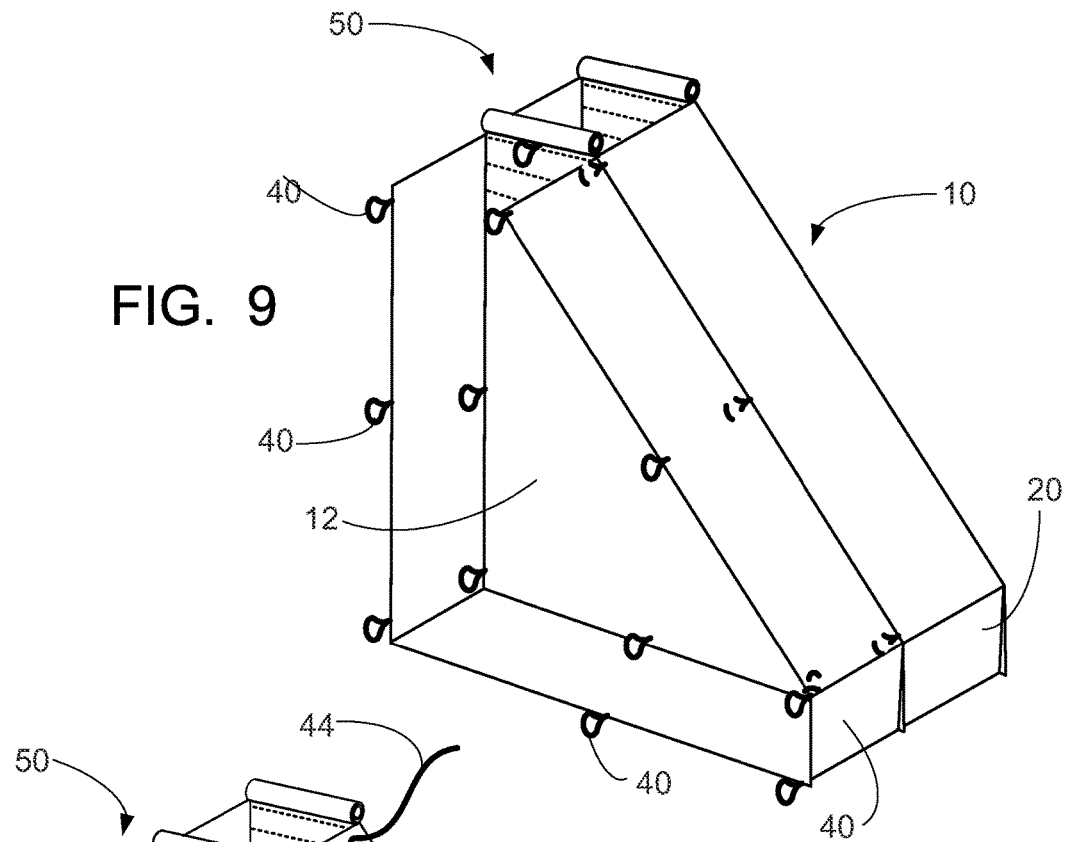
FIG. 9 illustrates preparing the connection chambers in the system of the present invention.
Figure 10:
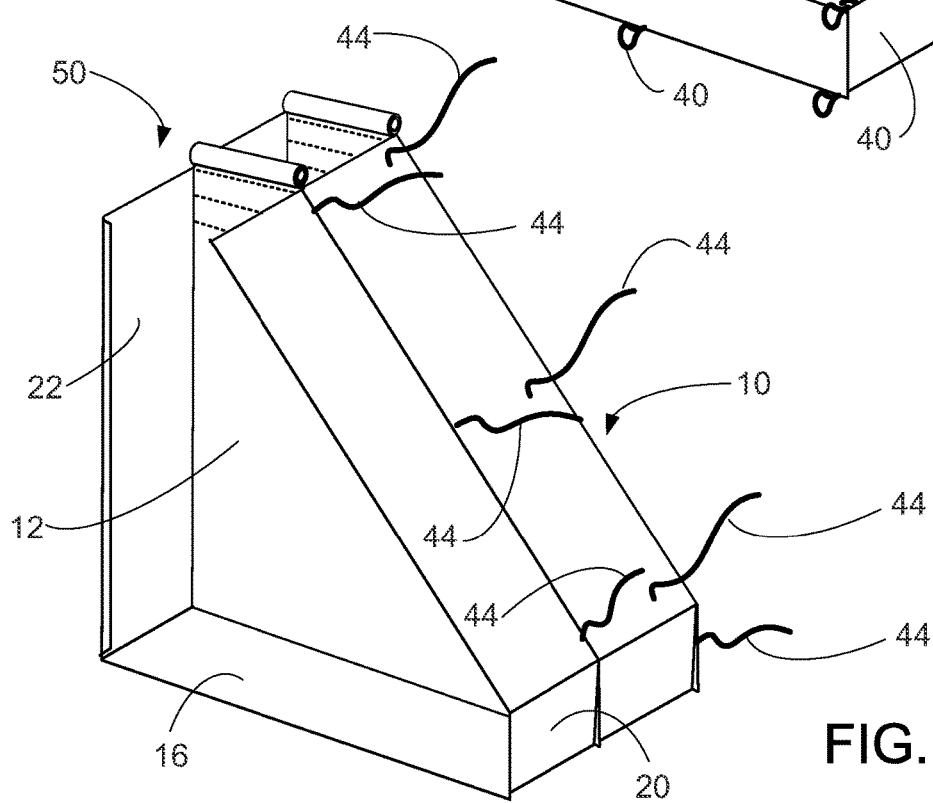
FIG. 10 illustrates adding ties to the first chamber of the next chain in the system of the present invention.

FIG. 9 illustrates the manner in which one chain 50 of chambers 10 are secured to one another. As illustrated, a chamber 10 at the end of the chain 50 has a plurality of loops 40, preferably 8 in number. In the preparation of the connection of chains 50 to one another, this is accomplished by attachment of the 8 loops 40 inside the seam 42 that attaches the front panel 18 to the side panels 12, of the end chamber 10 as seen in the FIG. 9. The connection is completed in a step as seen in FIG. 10. This Figure illustrates the step of adding ties 44, preferably 16 in number, to the first chamber 10 of the next chain 50 of chambers 10. The sixteen ties 44 would tie into the loops 40 to anchor the unfilled chain 50 to a previously filled chain 50 of chambers 10.

Figure 11:
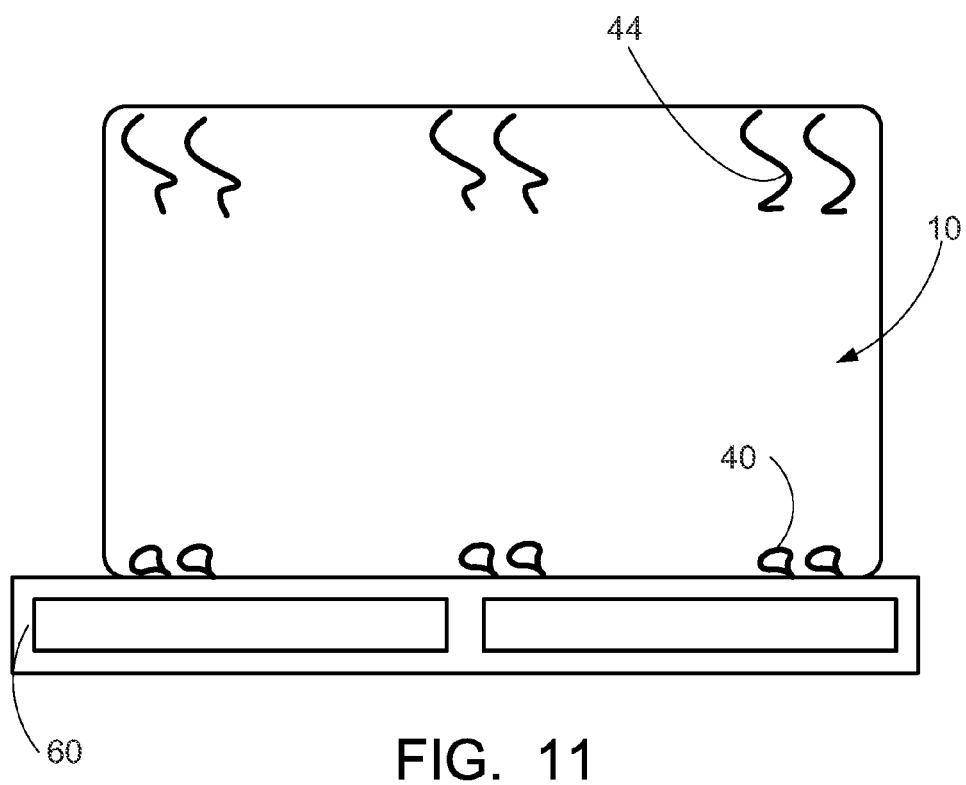
FIG. 11 illustrates packing completed chains in the system of the present invention.

In FIG. 11, when a chain 50 of empty chambers 10 is complete, there is illustrated the packing of the completed chain 50 whereby each chain 50, in the preferred embodiment, should be packed with the front panel 18, having the loops 40 down on the pallet 60 first, and the chamber 10 with the ties 44 on top.

Having discussed the construction of the chain 50 of a plurality of bulk bags 10, another very novel feature of the invention is the manner in which the individual bags 10 of a chain 50 are filled. The process has been found to be efficient and very cost effective, yet require very little manpower.

Figure 13:
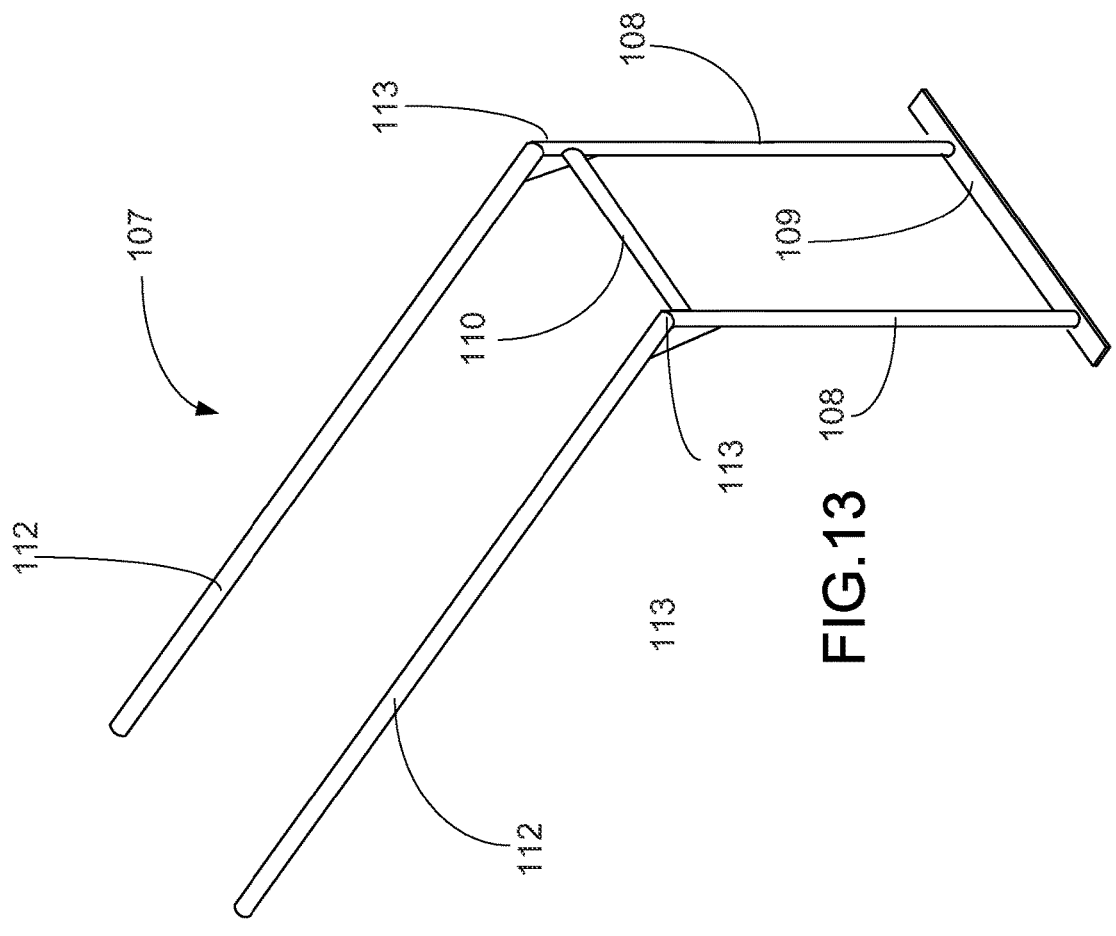
FIG. 13 illustrates the L portion of the filling frame in the system of the present invention.
Figure 12:
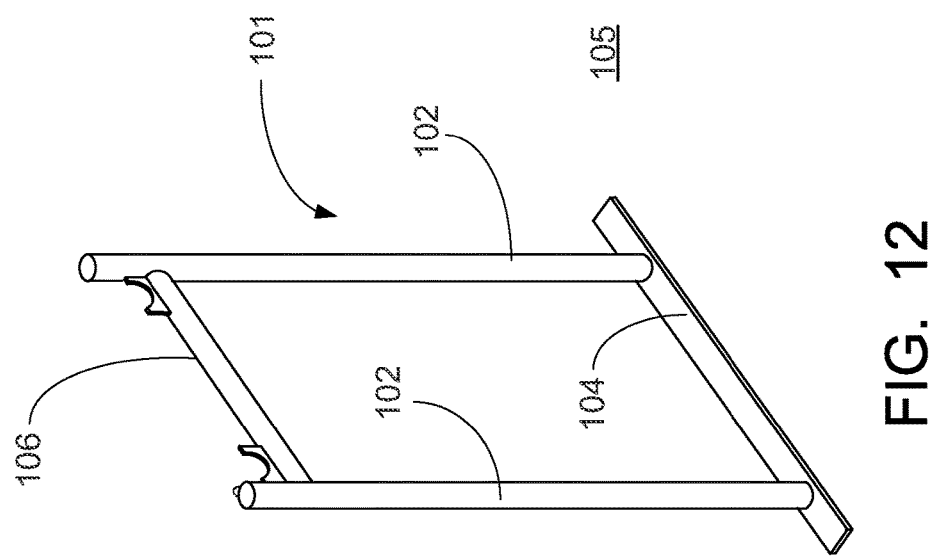
FIG. 12 illustrates the H portion of the filling frame in the system of the present invention.
Figure 15:
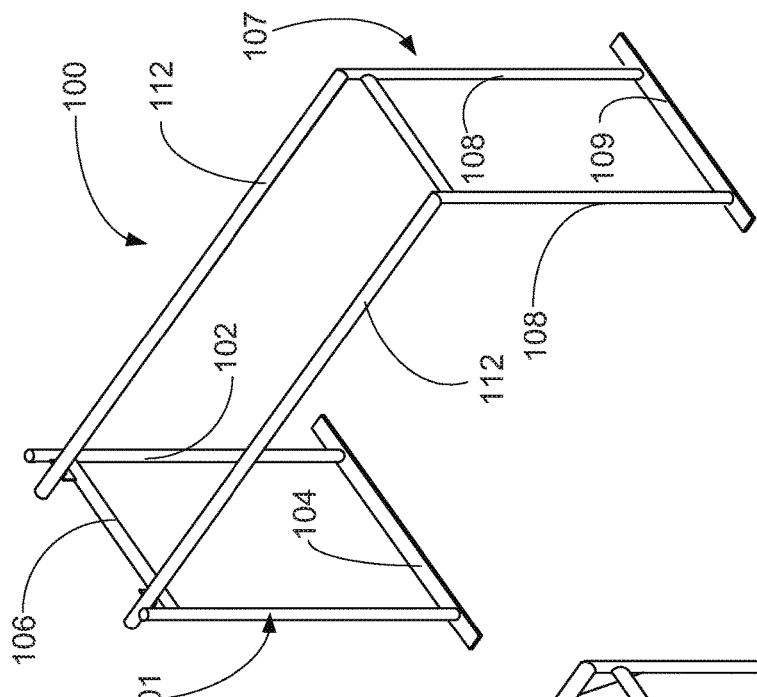
FIG. 15 illustrates the L portion fully engaged to the H portion of the filling frame in the system of the present invention.
Figure 14:
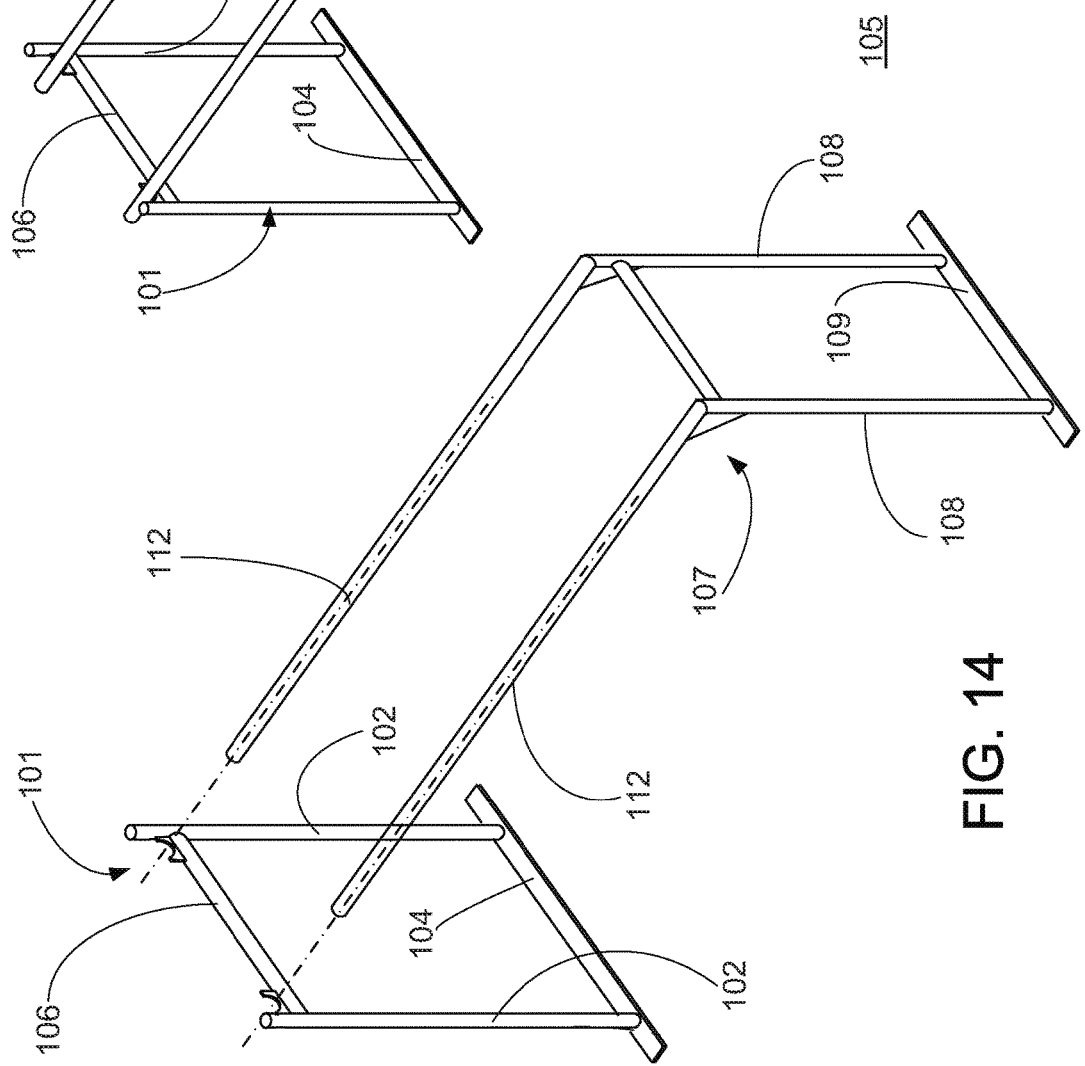
FIG. 14 illustrates the L portion being moved in position to engage the H portion of the filling frame in the system of the present invention.

Reference is now made to FIGS. 12-24 which illustrate the system or method for filling the chain 50 of empty chambers 10, with the use of a plurality of frames 100. Turning first to FIG. 12, there is illustrated a first H portion 101 of the frame 100, comprising a pair of upright leg portions 102, supported on a flat base member 104, resting on the ground or other surface 105, and an upper transverse member 106, which maintain the legs 102 in parallel relationship. In FIG. 13, there is illustrated the L portion 107 of the frame 100, which comprises also a pair of upright leg portions 108, supported on a flat base member 109, also resting on the ground or other surface 105, and an upper transverse member 110. Unlike H portion 101, there are provided a pair of arms 112 extending out from each of the upper ends 113 of each leg member 108. As seen in FIG. 15, frame 100 is fully erected, with the ends 114 of each arm 112 is resting on the transverse member 106 of the H portion 101. The function of this erected frame 100 will be discussed further.

In the next series of drawing figures, beginning with FIG. 16, there will be discussed the manner in which a chain 50 of empty bulk bags 10 are utilized with the frames 100 to enable the chain 50 of bags 10 to be filled into a continuous flood barrier. As seen first in FIG. 16, a chain 50 has been delivered to the filling area, and the first bags in the chain are extended to full width. The first bag 10, as seen, when open, allows the two arms 112 of a first L portion 107 to be threaded through each sleeve 30 on the walls of the bag 10, as illustrated. When the ends of the arms 112 extend out through each fabric channel or sleeve 30 of the bag 10, each end is then set to rest on the transverse bar 106 of the H portion 101 of frame 100, so that the bag is fully supported by frame 100, as fully seen in FIG. 15. At this point, first bag 10 is ready to be filled with material, by any convenient means, such as a front loader or other device, as discussed earlier.

Figure 16:
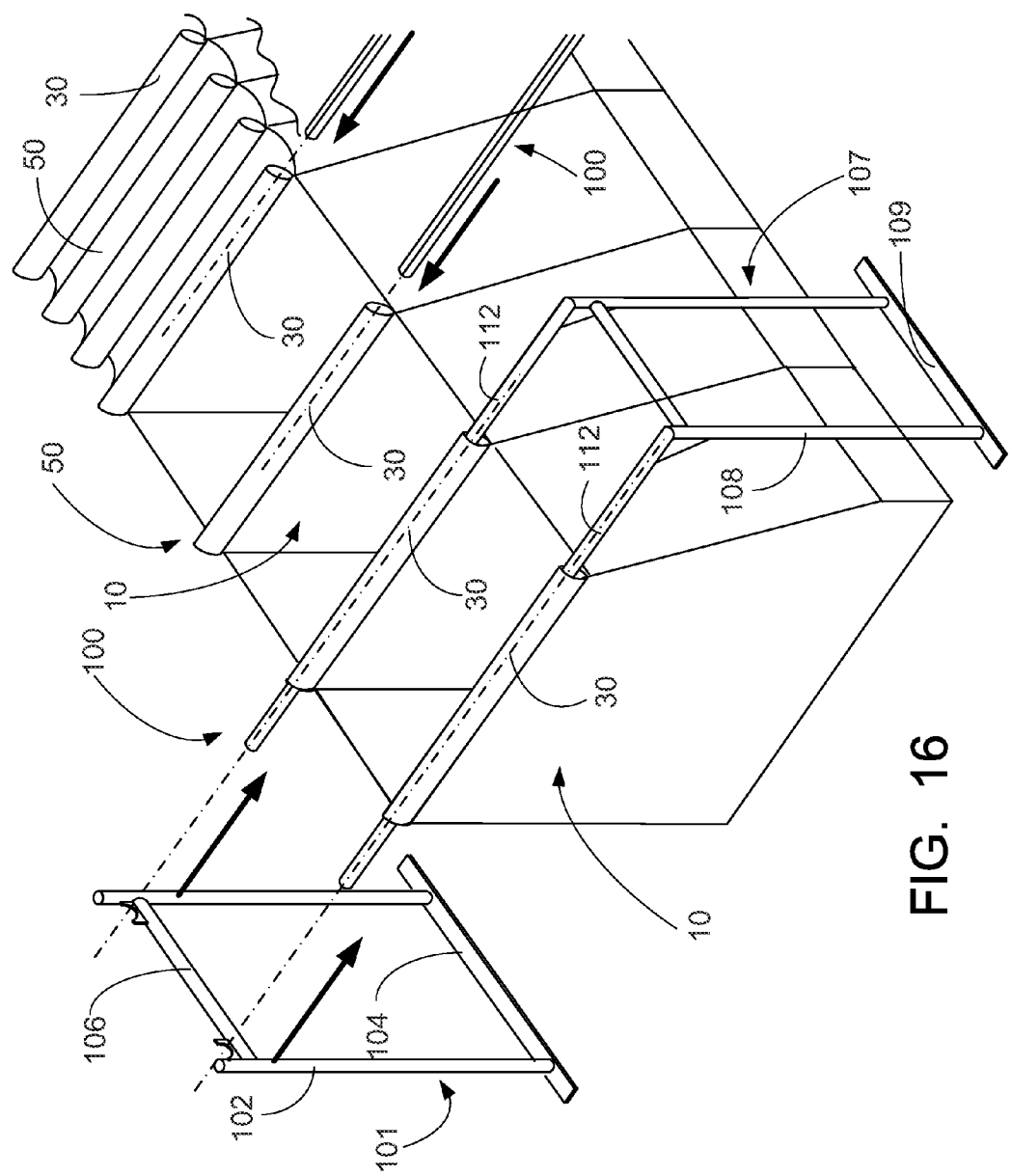
FIG. 16 illustrates bulk bags from a continuous chain being engaged by the L portion of the filling frames engaging the sleeves of the bulk bags and then to be engaged onto the H portion of the filling frame.

Still making reference to FIG. 16, because the first bag 10 is supported by a first frame 100, the next frame 100 would be secured to the next set of fabric channels 30. As seen in FIG. 16, because each adjoining bag 10 shares a fabric channel 30 with the next bag 10, the next frame 100 would engage the sleeves on both sides of the third bag 10, and when in place, the two frames 100 would effectively support the three first bags 10. Therefore, in effect, a frame 100 would be needed on every other bulk bag 10, rather than every bulk bag 10.

To reiterate, once a bag 10 is secured by a frame, or secured between two frames 100, as is the second bag 10 in FIG. 16, the bag 10 is ready to be filled with material. As seen, once a bag 10 is filled, it becomes self-supporting, and no longer requires a frame 100 for support. Therefore, the frame 100 may be removed from bag 10, and each H portion 101 and L portion 107 may be carried over to the next unsupported bag 10 in the chain 50, and set up in the manner as described. This "leap frogging" of frames is very important, since rather than the entire chain 50 of bags 10 needing support, in experiments, it has been found that a total of between five and 10 frames are required, in the setting up a bag to be filled, dismantling the frame 100 after the bag is filled, and moving it to the next bag 10 to be filled.

Figure 17:
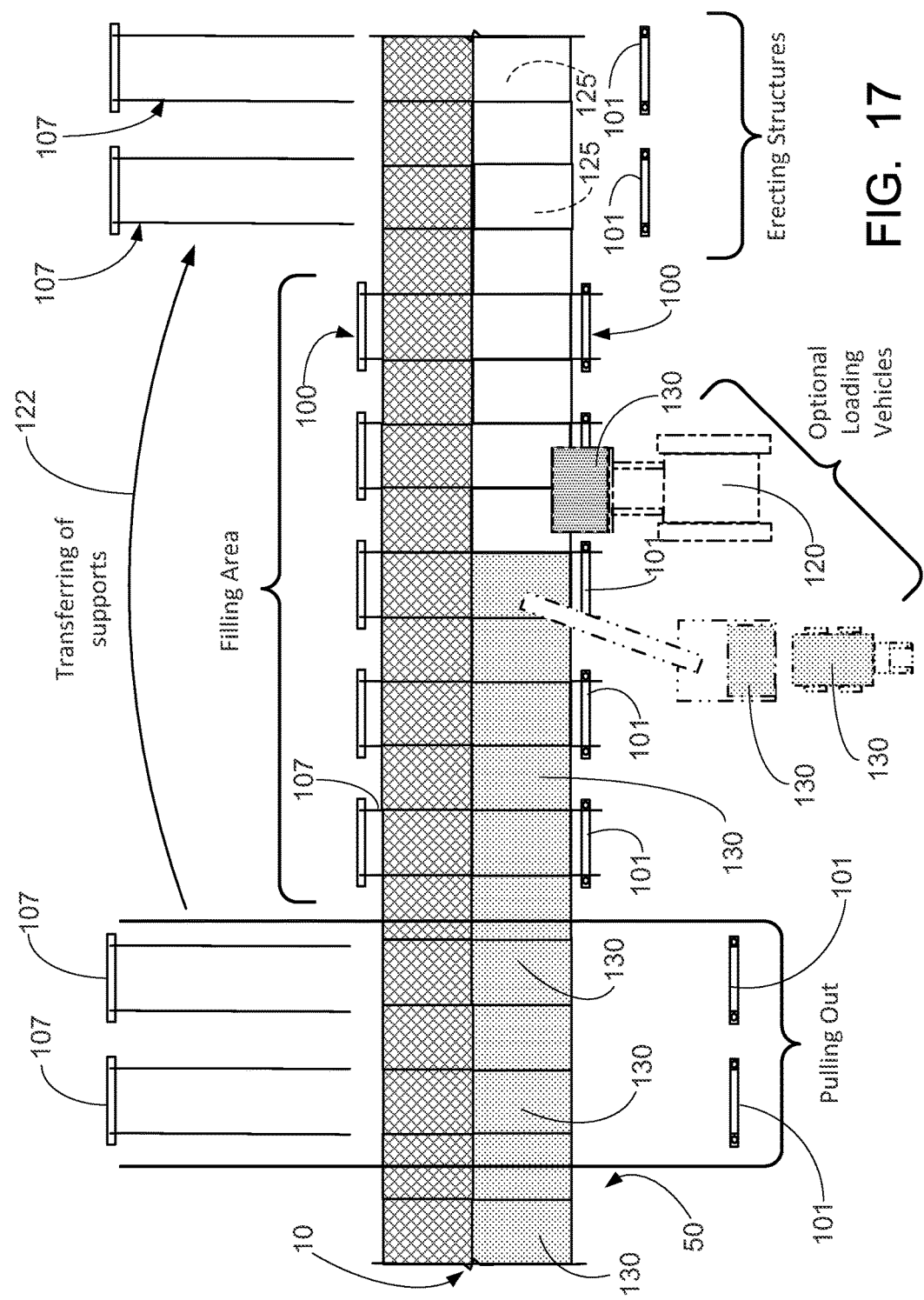
FIG. 17 illustrates the entire process of "leap frogging" the support frames from filled to empty bulk bags as the chain of bags barrier wall is being constructed.

This is important since it saves time, and requires less frames 100 in the filling as seen in FIG. 17. There is illustrated a plurality of bags 10, namely 19 bags total, in a segment of chain 10. As seen from the left of the Figure, the first ten bags 10 have been filled with bulk material 130, such as sand, gravel, or the like, and a front loader 120, or other similar device is shown in the process of filling the eleventh bag in the series. The remainder of the 19 bags are not yet filled, as seen by empty spaces 125, although a total of four bags 10 are supported by two frames 100. As further seen on the left end of the Figure, the first bags which are filled no longer require the support of frames 100. Therefore the H portions 101 and L portions 107 of each frame 100 has been withdrawn and these frames will be carried to a point further down the line, in the direction of arrow 122, to then support the unfilled bags 10 at the right end of the drawing Figure. So, in effect, as illustrated, although a complete chain 50 may comprise 100 bags attached end to end, as seen, there are only seven frames 100 which are used repeatedly, as the frames "leap frog" over the filled bags to support unfilled bags. This unique filling system requires less frames 100 to be used, and also allows workers to transport the frames 100 along the chain of bags a shorter distance during the loading process.

This process is repeated throughout the length of the entire chain 50 until all bags in the chain 50 are filled. As discussed earlier, in reference to the bag construction, in FIGS. 1 through 11, when a first chain 50 has been filled, reference is made to FIGS. 18 and 19, where the last bag 10 in the chain 50 is left without an end or side wall 12, so that the first full bag 10 on the next chain 50 is set into the end bag 10 of the first chain 50, the walls are tacked to one another, in the fashion as discussed earlier, and the second chain 50 can be unfurled as each bag 10 supported by the frames 100, as discussed, and the process continues.

Figure 18:
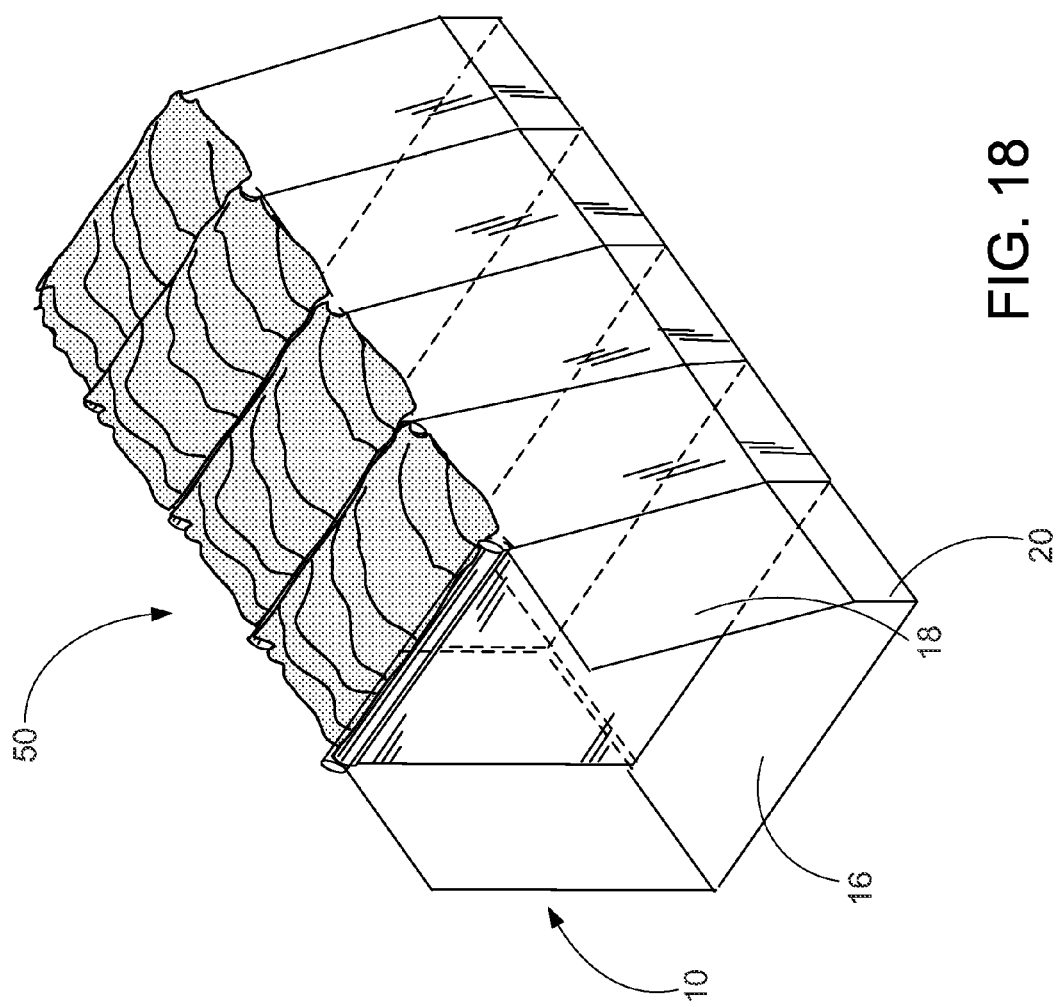
FIGS. 18 and 19 illustrate views of a fully constructed chain of bags ready to receive and be secured to a next chain of empty bags to be filled.
Figure 19:
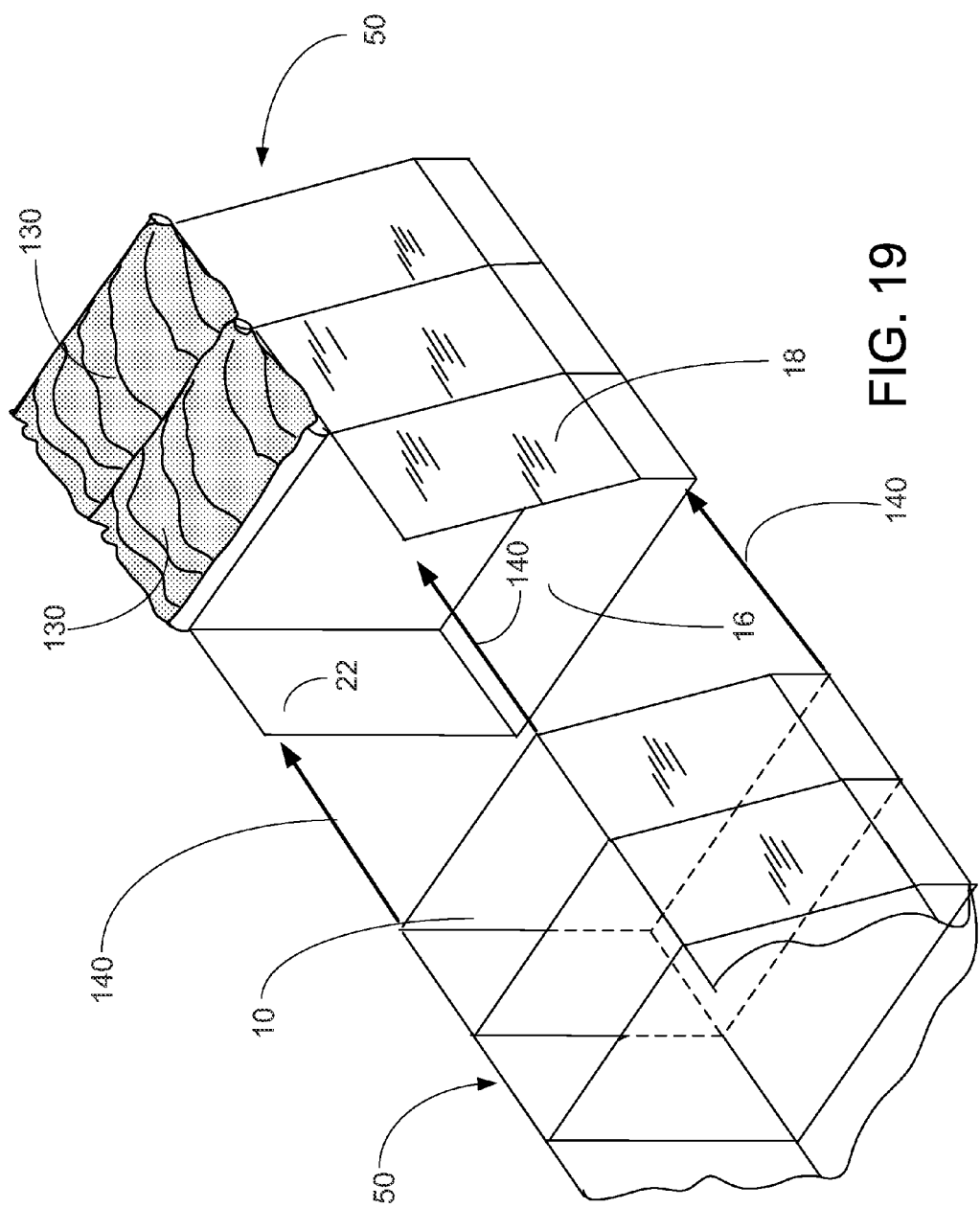

Although it was discussed earlier in regards to FIGS. 9 and 10, FIGS. 18 and 19 illustrate one end of a completely filled chain 50 of bags 10 ready to be connected to a first end of a second chain 50 of empty bags 10, which need to be filled. Rather than repeat what was stated in discussing FIGS. 9 and 10, as seen in FIG. 18, the final bag 10 of the first chain 50 is without a sidewall, and is ready to accommodate the first end of the second chain 50. As seen in FIG. 19, the first completed bulk bag 10 of the second chain 50 will slidably engage into the end bag 10 of the first chain 50, as seen by Arrows 140 and be attached as was discussed in FIGS. 9 and 10. It has been found that once the first bag 10 of the second chain 50 is filled, its outer wall will expand and form a fluid tight seal against the wall of the last filled bag 10 in the first chain 50, thus assuring a continuous seal along the entire wall made up of multiple chains 50.

Figure 20:
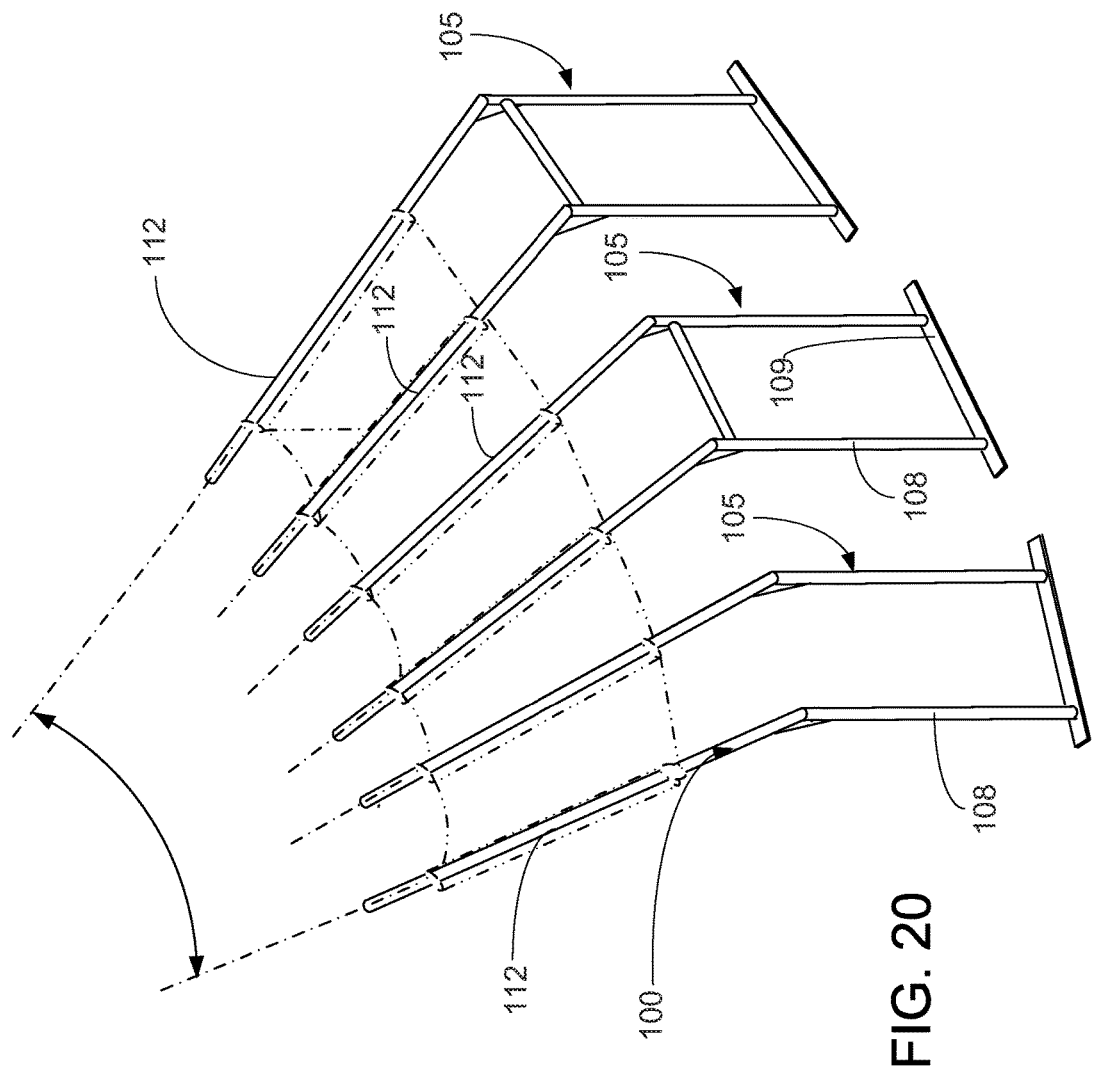
FIGS. 20 through 21A illustrate views of a chain being constructed around a curvature formed in the barrier wall.
Figure 21:
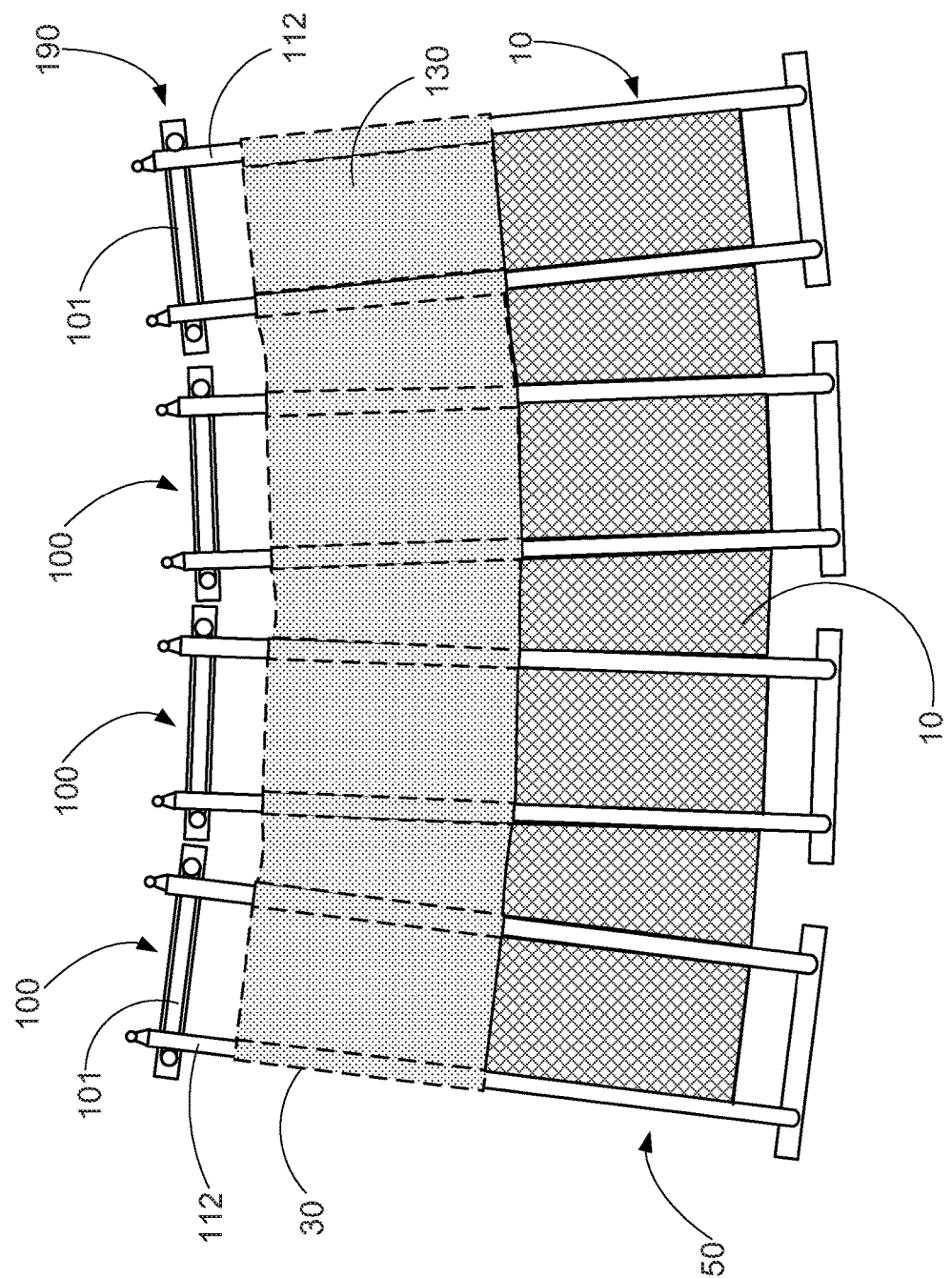
Figure 21A:
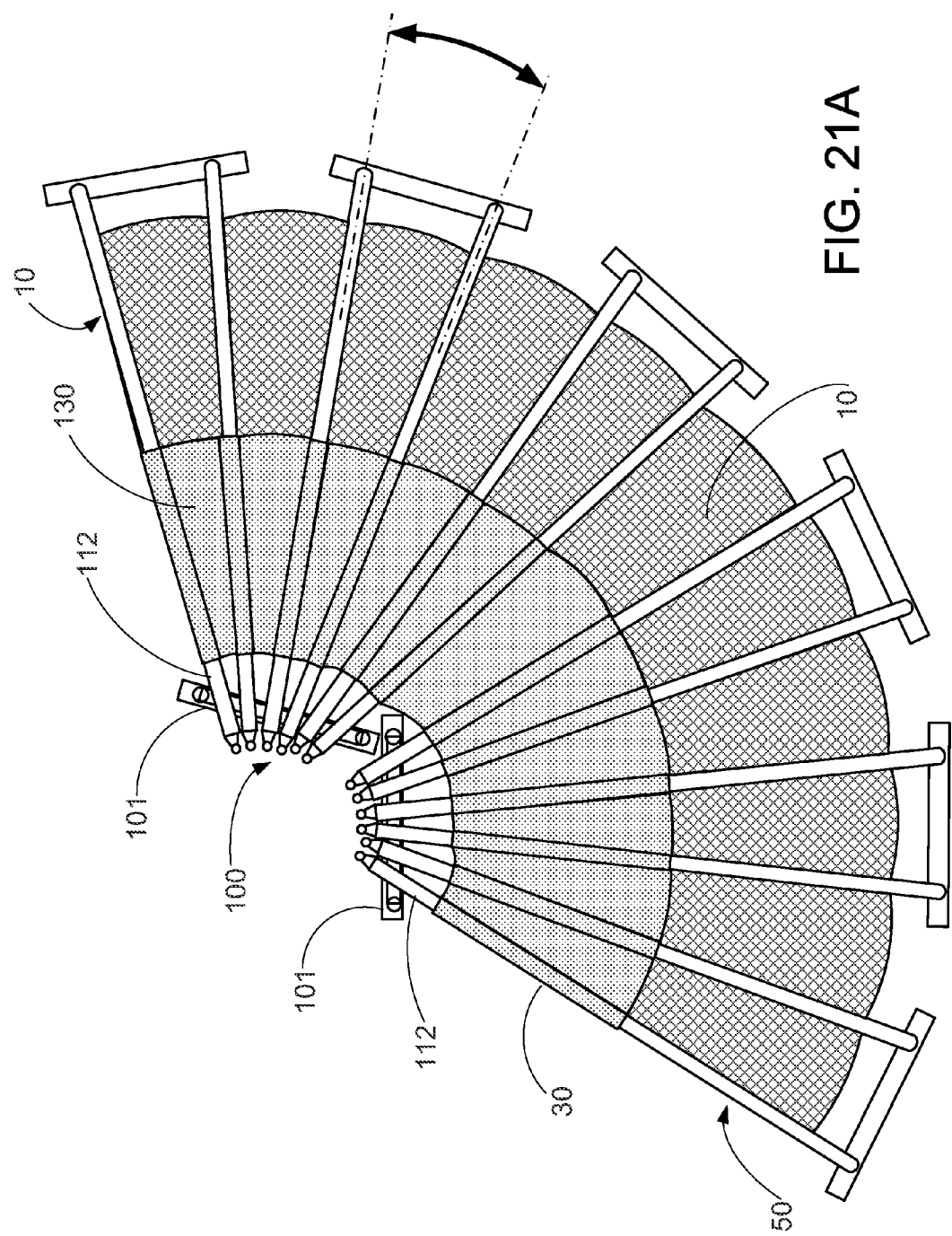
Figure 22:
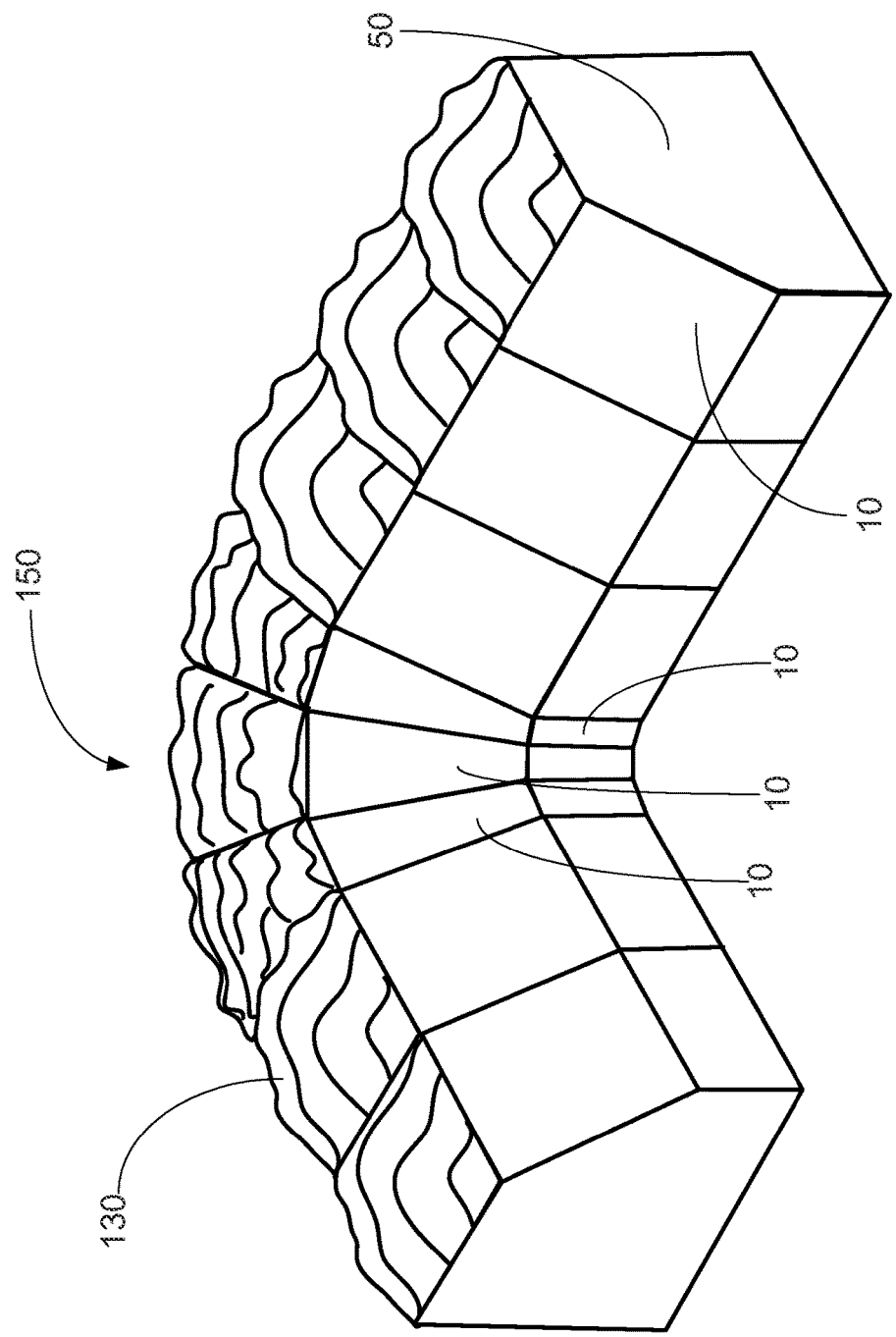
FIG. 22 illustrates the overall view of a constructed chain that has formed a 90 degree turn in the barrier chain.

During the erection of a continuous barrier 150, it may be necessary that the barrier make a bend in order to avoid obstacles are to follow a shoreline, as the case may be. Reference is made to FIGS. 20 through 21A which illustrate a point at which the barrier 150 must be adjusted to make the necessary turn. As seen, when empty bulk bags 10 are positioned in a series of frames 100, the distal ends of the arms 112 of the frame 100 may be adjusted inward to allow the frames 100 to begin to form a curve rather than a normal straight line. This is usually accomplished by the ends of each of the arms 112 being slanted toward the middle of the transverse member 106 of the H portion 101, so that over a series of such adjustments, the turn will be completed and will be a secure barrier with a bend in the wall as seen in the FIG. 22. In FIG. 21A, it is seen where the arms 112 of a plurality of frames 100 are resting on a single transverse member 106 of the H portion 101, and in doing so, the barrier is able to make the severe 90 degree turn which is shown completed in FIG. 22.

Finally, FIGS. 23 and 24 show views of a chain 50 of bags 10, where the chain 50 is serving as a flood barrier. In FIG. 23, the chain 50 has been set up so that the slanted forward face 18 of the bags 10 face the flooding water 160, while FIG. 24 shows the chain 50 where the vertical rear wall 22 is facing the flooding water 160. Through experimentation, it has been found that the positioning of the chain 50 as seen in FIG. 24, is the preferred manner, in view of the fact that should flood waters 160 top the filled chain 50, the chain 50 will not collapse from the weight of the water, since the water presses down on the slanted face 22, and maintains the chain 50 in place. Also, to help support the chain 50 upright, there could be provided a layer of soil 170 to help the system remain in place against the force of the rising water 160.

| PART NUMBER | DESCRIPTION |
|---|---|
| 10 | chambers |
| 12, 14 | sidewalls |
| 16 | floor portion |
| 18 | forward face |
| 20 | toe portion |
| 22 | rear wall |
| 24 | container space |
| 26 | upper end |
| 28 | open end |
| 30 | fabric channels |
| 32 | diagonal line |
| 35 | fabric |
| 40 | loops |
| 42 | seam |
| 44 | ties |
| 45 | arrows |
| 50 | chain |
| 60 | pallet |
| 100 | frames |
| 101 | H-portion |
| 102 | leg portions |
| 104 | base member |
| 105 | surface |
| 106 | upper transverse member |
| 107 | L-portion |
| 108 | leg portions |
| 109 | base member |
| 110 | upper transverse member |
| 112 | arms |
| 113 | upper ends |
| 114 | ends |
| 122 | arrow |
| 125 | empty spaces |
| 130 | bulk material |
| 150 | continuous barrier |
| 160 | flood water |
| 170 | soil layer |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A system for constructing any desired length or height cellular chain for use as a protective wall system, comprising:
   a chain of fabric cells, each having an upper end, and interconnected along their sidewalls to define the cellular chain;
   a fabric channel formed on the upper ends of each of an adjoining cells sidewalls;
   a support frame, comprising a first frame member having a pair of arm members for threading through two adjacent fabric channels;
   a second frame member for receiving a distal end of each of the arm members of the first frame member, at a level so that the cell is supported by the arm members; and
   bulk material to be poured into the supported cell, to a level that the cell is substantially filled and no longer requires the support of the support frame, so that the support frame can be removed and positioned onto the next pair of fabric channels to fill the next empty cell.

2. The system in claim 1, wherein the support frame is a first frame and further comprising a second frame engaging a second pair of fabric channels adjacent the first pair of fabric channels secured by the first frame, so that the two frames support three empty cells that are ready to be filled with material.

3. The system in claim 2, wherein when the three cells are filled with material, the cells become self-supporting without a need for the two frames.

4. The system in claim 3, wherein when the first three cells are filled, the first and second frames are removed and positioned onto the next two sets of pairs of fabric channels, so that the next three cells can be filled.

5. The system in claim 2, wherein the first and second frames may be positioned along the chain of cells to allow the chain to bend from a straight flood barrier system to a curved flood barrier system if necessary.

6. A method of constructing any desired length or height cellular chain for use as a protective wall system, comprising the steps of:
    providing a chain of fabric cells, each having an upper end, and interconnected along their sidewalls to define the cellular chain;
    forming a fabric channel on the upper ends of each of an adjoining cells sidewalls;
    providing a first frame member having a pair of arm members;
    threading each arm member through two adjacent fabric channels;
    providing a second frame member for receiving a distal end of each of the arm members of the first frame member, at a level so that the cell is supported by the arm members;
    pouring bulk material into the supported cell, to a level that the cell is substantially filled and no longer requires the support of the frame;
    removing the first and second frame members from the filled cell; and
    positioning the first and second frame members onto the next pair of fabric channels to support the next empty cell to be filled.

7. The method in claim 6, further comprising the step of engaging first and second frame members to a second pair of fabric channels adjacent the first pair of fabric channels secured by the first frame member, so that the first and second frame members support three empty cells that are ready to be filled with material.

8. The method in claim 7, comprising the step of removing the first and second frame members from the first and second pair of fabric channels when the three cells supported by the first and second frame members are filled with material.

9. The method in claim 8, wherein when the first and second frame members are removed from the first three filled cells, the first and second frame members are positioned onto the next two sets of pairs of fabric channels, so that the next three cells can be filled.

10. The method in claim 6, wherein the chain of cells is a first chain and further comprising the step of engaging a first empty cell of a second chain of cells to an outer wall of a last unfilled cell of the first chain, so that when the first empty cell is filled, it forms a fluid seal against the outer wall of the last filled cell in the first chain.

11. The method in claim 6, wherein each cell has a substantially vertical rear wall and a slanted front wall and wherein the plurality of cells forming the chain are positioned so that each of the substantially vertical rear walls of the filled cells face flooding waters and the slanted front wall of each of the cells face away from the flooding waters which adds stability to the chain of cells forming the flood barrier.

12. The method in claim 11, wherein a plurality of first frame members are provided and wherein arm members of the plurality of first frame members are supported onto a single second frame so that the barrier is able to make a sharp turn if required.

* * * * *